(12) United States Patent
Hertzmann et al.

(10) Patent No.: US 11,941,746 B2
(45) Date of Patent: Mar. 26, 2024

(54) ACCURATE SMOOTH OCCLUDING CONTOURS

(71) Applicant: Adobe Inc., San Jose, CA (US)

(72) Inventors: Aaron Hertzmann, San Francisco, CA (US); Shayan Hoshyari, Vancouver (CA); Chenxi Liu, Vancouver (CA)

(73) Assignee: Adobe Inc., San Jose, CA (US)

( * ) Notice: Subject to any disclaimer, the term of this patent is extended or adjusted under 35 U.S.C. 154(b) by 164 days.

(21) Appl. No.: 17/466,670

(22) Filed: Sep. 3, 2021

(65) Prior Publication Data

US 2023/0074094 A1  Mar. 9, 2023

(51) Int. Cl.
*G06T 15/20* (2011.01)
*G06T 7/564* (2017.01)
*G06T 17/20* (2006.01)

(52) U.S. Cl.
CPC .............. *G06T 15/20* (2013.01); *G06T 7/564* (2017.01); *G06T 17/205* (2013.01)

(58) Field of Classification Search
CPC ........ G06T 15/20; G06T 7/564; G06T 17/205
See application file for complete search history.

(56) References Cited

U.S. PATENT DOCUMENTS

2009/0153578 A1* 6/2009 Kim .................. G06T 15/02
 345/582
2011/0148897 A1* 6/2011 Wong .................... G06T 11/001
 382/199
2015/0221106 A1* 8/2015 Winnemoeller ...... G06T 11/203
 345/441
2018/0040169 A1* 2/2018 Nakagawa ................ G06T 7/70

OTHER PUBLICATIONS

Benard, P. et al., "Line drawings from 3D models: a tutorial," Foundations and Trends in Computer Graphics and Vision, 2019, 11 (1-2), pp. 5-110.
Benard, P. et al., "Computing Smooth Surface Contours with Accurate Topology," ACM Transactions on Graphics, vol. 33, Issue 2, Article 19, Mar. 2014, pp. 1-21.
Hertzmann, A. et al., "ConTesse: Accurate Smooth Occluding Contours," ACM Trans. Graph., vol. 37, No. 4, Article 111, Aug. 2018, pp. 1-5.
Gu, X. et al., "Geometry Images," ACM Transactions on Graphics, vol. 21, No. 3, Jul. 2002, pp. 355-361.
Weber, O. et al., "Locally Injective Parametrization with Arbitrary Fixed Boundaries," ACM Transactions on Graphics, vol. 33, No. 4, Article 75, Jul. 2014, 12 pages.

* cited by examiner

*Primary Examiner* — Phuc N Doan
(74) *Attorney, Agent, or Firm* — Nicholson De Vos Webster & Elliott LLP

(57) ABSTRACT

Embodiments are disclosed for computing accurate smooth occluding contours. In one embodiment, a method of computing accurate smooth occluding contours includes projecting a boundary polygon associated with a first region of a three-dimensional (3D) object to a two-dimensional (2D) image plane, the boundary polygon comprising a plurality of contour vertices and edges connecting the plurality of contour vertices, triangulating the first region in the 2D image plane to generate a 2D triangulation, and generating a 3D mesh for the first region by mapping the 2D triangulation to the 3D object.

20 Claims, 14 Drawing Sheets

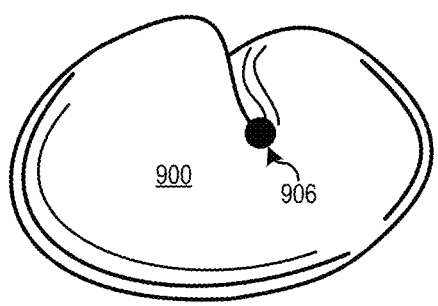
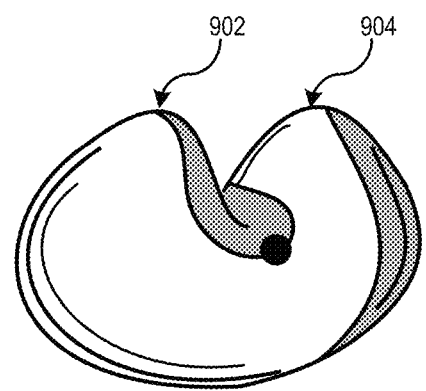
FIG. 9A  FIG. 9B
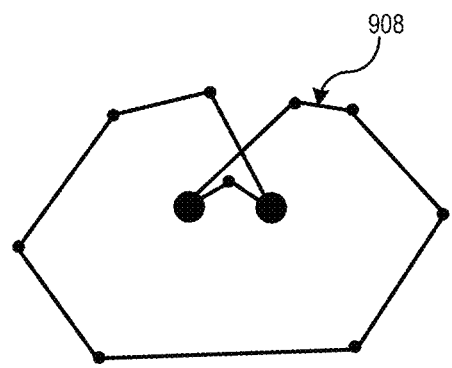
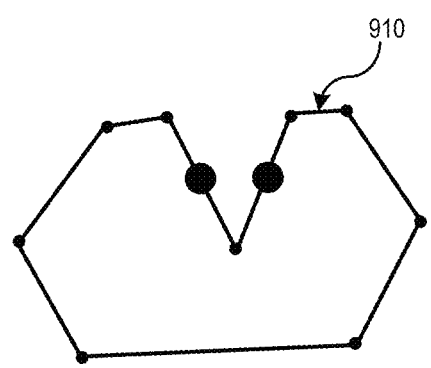
FIG. 9C  FIG. 9D

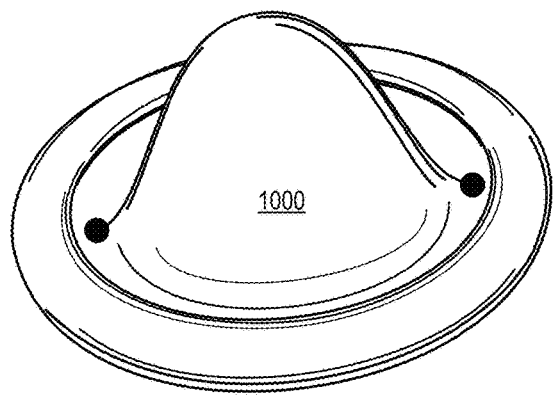
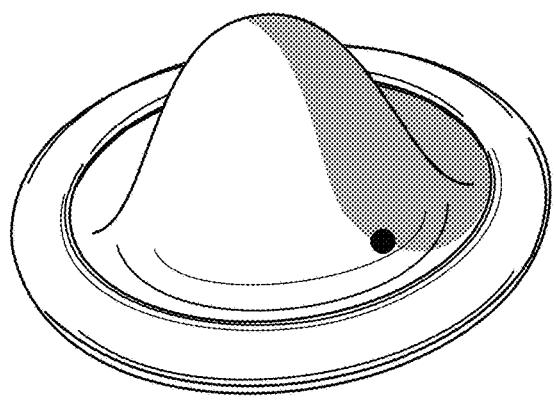
*FIG. 10A*  *FIG. 10B*
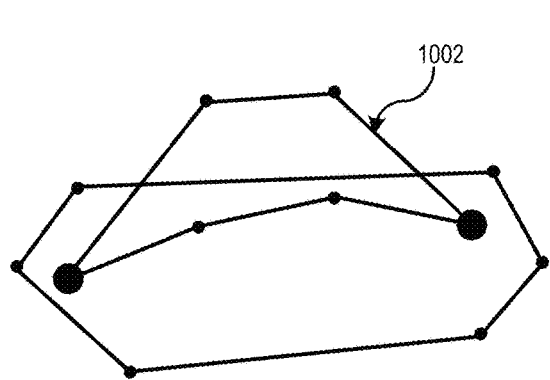
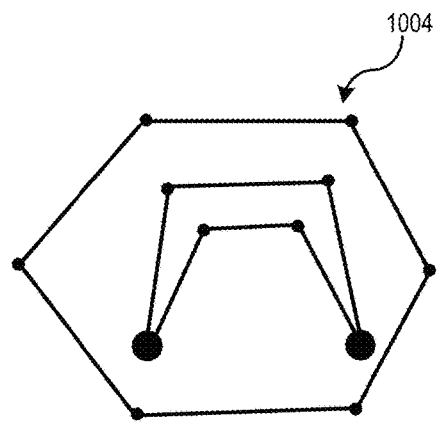
*FIG. 10C*  *FIG. 10D*

ACCURATE SMOOTH OCCLUDING CONTOURS

BACKGROUND

A three-dimensional (3D) object can be rendered from various viewpoints. When rendered from a specific viewpoint, only portions of the object are visible (e.g., there is at least one portion of the object facing the viewpoint and at least one portion of the object facing away from the viewpoint). Occluding contours are surface curves that separate the visible portions of the 3D object from the invisible portions. A line drawing can be obtained by rendering these occluding contours. Computing visible occluding contours (e.g., also referred to herein as "contours") is a fundamental building block of 3D Non-Photorealistic Rendering, because contours allow one to produce beautiful and stylized artistic images and animation. This problem dates back to the earliest days of computer graphics, yet it remains unsolved for smooth surfaces. Direct visibility tests for smooth occluding contours are fundamentally unreliable, and small errors in visibility tests can propagate to produce topologically invalid drawings, such as objects with large gaps in their silhouettes. Topological errors are particularly objectionable when animating stylized curves since curve stylization can be very sensitive to curve topology. These issues apply even to triangle meshes when they are used represent smooth objects.

The most accurate current method is that of Bénard et al. as described in Pierre Bénard, Aaron Hertzmann, and Michael Kass. 2014. Computing Smooth Surface Contours with Accurate Topology. ACM Trans. Graph. 33, 2, Article 19 (2014). While effective, this method has a number of major shortcomings. First, the algorithm is very complex to understand and implement. Second, the algorithm is very slow. Finally, the algorithm does not produce a fully "consistent" output mesh, which could, in theory, lead to some incorrect results. Moreover, inconsistent results would make it difficult to produce an accurate planar map, which is necessary for some non-photorealistic rendering algorithms.

These and other problems exist with regard to computing accurate smooth occluding contours in electronic systems.

SUMMARY

Introduced here are techniques/technologies that compute accurate smooth occluding contours. For example, in some embodiments, an occluding contours generation system can receive a three-dimensional object, such as a smooth surface, and a camera orientation. The occluding contour of a 3D object represents the boundary beyond which the object, or portions of the object, are no longer visible, having been occluded by the object. The occluding contours system can generate an initial mesh for the 3D object and, based on the camera orientation, insert contour vertices. The 3D object can be divided into regions based on the contour (e.g., at least one front-facing region and at least one back-facing region). Each region may then be processed separately, and the results stitched back together along the contour to generate a consistent output mesh.

For example, the contour vertices can be projected into a two-dimensional image plane, where they form a boundary polygon for a first region. The boundary polygon can be triangulated in 2D, and the resulting triangulation can be refined by sampling additional points along paths across the 3D object and projecting these sampled points into the image plane. Using the sampled points and the contour vertices, a refined triangulation can be computed and mapped back to the 3D object. This can be repeated for each remaining region. Once each region has been processed, the resulting meshes are stitched back together along the contour to generate the output mesh.

The output mesh can be provided to a rendering engine, such as a mesh contour detection and stylization system. The rendering engine can identify the contour in the output mesh and then generate, e.g., a stylized line drawing, a path object, or other output.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIGS. 9A-9D illustrate an example of regions of a weakly self-overlapping object in accordance with one or more embodiments;

FIGS. 10A-10D illustrate an example of regions of a weakly self-overlapping object with holes in accordance with one or more embodiments;

DETAILED DESCRIPTION

One or more embodiments of the present disclosure include an occluding contours generation system that computes occluding contours for an input object (e.g., smooth surface, such as a Catmull-Clark subdivision surface) from a specified viewpoint. The occluding contours generation system uses a contour generator to identify a set of points along the occluding contour(s) of the input object and then produces an initial triangle mesh. This initial mesh is partitioned into regions, where each region includes entirely front-facing triangles or entirely back-facing triangles. In some embodiments, additional object preparation steps are performed, such as removing twists, removing holes, etc. Once the contour has been inserted, the edges are projected from the 3D object into the 2D image space, resulting in a contour polygon comprising the boundaries and/or contours surrounding the region. For each region, the contour boundaries are triangulated in image space. Although embodiments are described with respect to triangulation, in various embodiments tessellation using different shaped primitives may also be performed.

The resulting vertices are then projected back into 3D space to points on the input object. For convex objects, this projection can be a relatively simple ray tracing exercise. However, for non-convex objects, such as self-overlapping, weakly self-overlapping (WSO), WSO with holes, etc., this process becomes more complex. In some embodiments, paths between vertices on the contour polygon are identified on the object's surface in 3D. Using these samples, a refined triangulation is then computed. This results in a final output mesh that can then be provided to a mesh contour detection and stylization system to generate a rendering of the object (e.g., stylized drawing or illustration, a vector graphic, etc.).

Embodiments address the deficiencies of prior techniques by providing more accurate contours using a simplified algorithm that yields faster results. For example, by performing triangulation in the 2D image plane for each region, the triangulation is simplified, and the resulting mesh is consistent (e.g., no front-facing triangles appear in back-facing regions, etc.). Because the resulting mesh is consistent, rendering errors or other inconsistencies due to inconsistent triangles are eliminated or greatly reduced. This is especially important when generating animations, where such errors are readily visible.

Figure 1:
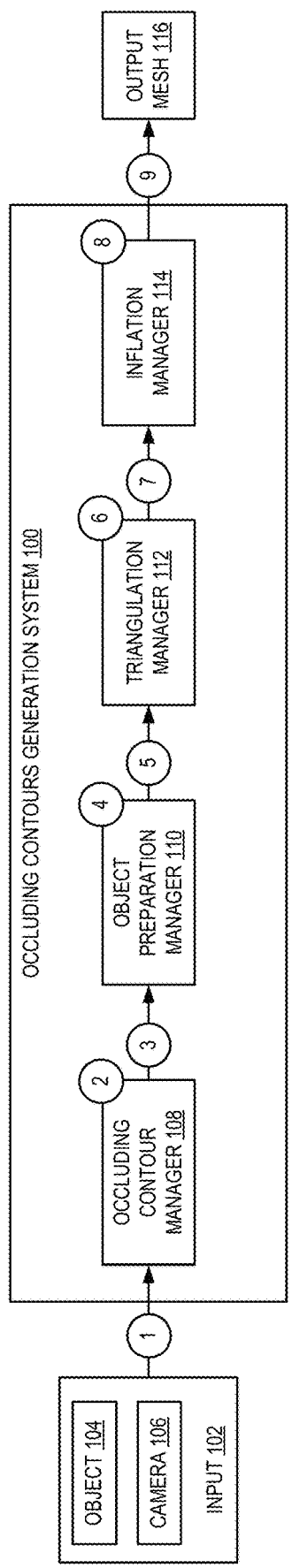
FIG. 1 illustrates a diagram of a process of computing accurate smooth occluding contours in accordance with one or more embodiments.

FIG. 1 illustrates a diagram of a process of computing accurate smooth occluding contours in accordance with one or more embodiments. As shown in FIG. 1, an occluding contours generation system 100 can receive an input 102 at numeral 1. In various embodiments, the occluding contours generation system 100 may be implemented as one or more web-based applications hosted on a remote server, and/or as part of a suite of desktop or mobile device applications or "apps." For example, the occluding contours generation system 100 may be implemented as part of a digital design application, or suite of applications, including but not limited to ADOBE CREATIVE CLOUD, ADOBE PHOTOSHOP, ADOBE ACROBAT, ADOBE ILLUSTRATOR, ADOBE LIGHTROOM and ADOBE INDESIGN. "ADOBE", "CREATIVE CLOUD," "PHOTOSHOP," "ACROBAT," "ILLUSTRATOR," "LIGHTROOM," and "INDESIGN" are either registered trademarks or trademarks of Adobe Inc. in the United States and/or other countries.

The input may include a 3D object 104, e.g., a Catmull-Clark subdivision surface or other smooth surface) and a camera position 106 which establishes the view of the object to be processed. If the input object is a convex, oriented smooth surface $\mathcal{S}$, then processing may be simplified. For example, occluding contour manager 108, at numeral 2, can generate an initial surface tessellation $\mathcal{P}$, viewed from camera position c. Each point $u \in \mathcal{P}$ maps to a point on the smooth surface $p(u) \in \mathcal{S}$. Each point has a corresponding surface normal n(u). The occluding contour generator is the set of points where $g(u)=(p(u)-c) \cdot n(u)=0$.

In this example, since the surface is a convex, oriented smooth surface, the image-space occluding contour of this surface is a convex, simple curve. The occluding contour manager 108 produces a mesh $\mathcal{M}$ from $\mathcal{S}$, so that the occluding contour of $\mathcal{M}$ also a simple, closed loop in image space. In some embodiments, $\mathcal{M}$ is required to have the same topology as $\mathcal{S}$, and that points on the new mesh are geometrically close to their corresponding points on the original mesh. No existing algorithm provably achieves this goal. For example, tessellations of the smooth surface can produce a mesh contour with self-intersections.

The first step is to convert the base mesh to a triangle mesh, and then insert contour vertices, using a contour insertion algorithm such as that described in Pierre Bénard, Aaron Hertzmann, and Michael Kass. Computing Smooth Surface Contours with Accurate Topology. ACM Trans. Graph. 33, 2, Article 19 (2014). This produces a set of occluding contour vertices. These vertices and the edges connecting them form a simple polyline on the mesh.

In 3D, these are simple curves on the 3D surface, and they partition the mesh into a front-facing region, and a back-facing region. All vertices in the front-facing region have $g(u)>0$, and $g(u)<0$ for the back-facing region. A triangle is consistent if it has the same orientation as the region it lies in: a triangle in the front-facing region is consistent if and only if the triangle is front-facing. (By construction, each region has at least one interior vertex.)

With the contour inserted and the surface divided into front facing and back-facing regions, each region is remeshed so that all triangles are consistent. In some embodiments, remeshing the front-facing region includes projecting the region boundary polygon to a 2D image plane. The projection is a convex polygon in 2D. Once projected into the 2D image plane, the 2D region is tessellated, for example using Constrained Delaunay Triangulation. With the region tessellated, each new interior vertex is then projected back to 3D by casting a ray from the camera through their 2D position and intersecting with the front-facing region. The back-facing region is remeshed in the same manner and the output mesh is produced by stitching these two regions along the contour.

Each region generated by this procedure is guaranteed to have the desired facing direction. This is because any valid 2D tessellation produces all clockwise or counterclockwise triangles as desired, and projecting a triangle from 2D to 3D preserves orientation. Hence, the contour generator for $\mathcal{M}$ is the interpolated contour, a simple closed loop. Moreover, the output surface is topologically equivalent to $\mathcal{T}$, and geometrically similar due to the use of $\mathcal{C}$ and the ray-casting step. Hence, this algorithm solves the contour meshing problem for the convex case.

While the above-described solution works for convex surfaces, non-convex surfaces present a greater challenge. For example, the occluding contours for non-convex surfaces may self-intersect in 2D. In addition to the case of simple polygons, contour polygons may fall into a number of categories, include self-overlapping polygons, weakly self-overlapping (WSO) polygons, and WSO with holes. A self-overlapping case occurs when one part of the surface occludes a different part of the surface. The WSO case occurs at a curtain fold cusp in the occluding contour. This creates a singularity in the 2D polygon. The WSO with holes case occurs where a region of the surface has holes or handles. In such instances, the region can be reduced to the WSO case by introducing cuts.

For such non-convex surfaces, the occluding contours generation system 100 implements a different algorithm. As in the convex surface case, the input 102 includes the 3D object 104 and a camera position 106. As discussed, the 3D object may be an orientable Catmull-Clark subdivision surface $\mathcal{S}$, viewed from a camera position c in generic position, such that back-faces are never visible. The surface may have boundaries, but no self-intersections. Additionally, it is assumed that the entire scene has positive depth from the camera, i.e., no part of the scene is behind the camera. It is additionally assumed that curtain folds self-overlap at most once in image space, i.e., no fusilli cusps. The input is received by the occluding contours generation system 100 at numeral 1. At numeral 2, occluding contour manager 108 parameterizes the subdivision surface by a base mesh $u \in \mathcal{P}$, so that $p(u)\mathcal{S}$ is some point on the surface. Each point is either front-facing $g(u)>0$, back-facing $g(u)<0$, or on the occluding contour $g(u)=0$, denoted F, B, or C for short.

The occluding contours generation system is then tasked to produce a new mesh $\mathcal{M}$ with the following properties:

The mesh has the same topology as the smooth surface, and every point on the mesh corresponds to some surface point. Each mesh point is geometrically close to its corresponding surface point, within a threshold distance.

The mesh's occluding contour C partitions the mesh into regions; each region comprises entirely front-facing triangles or entirely back-facing triangles. Each mesh vertex in C corresponds to a C point on the surface. Every region must have at least one interior mesh vertex. Each interior vertex of a front-facing region must correspond to an F vertex on S; likewise, interior vertices in back-facing regions must be B.

Occluding contour manager 108 produces an initial mesh $\mathcal{M}$ by subdividing the base mesh $\mathcal{P}$ a set number of levels. For example, this may be done to eliminate non-quad faces, splitting all quads into triangles. Each vertex of the initial mesh is labeled F or B depending on whether the corresponding smooth surface point is front- (F) or back-facing (B). Hidden zero-crossings are found by root-finding of g(u) on all FF and BB edges, and edges are split accordingly. Root-finding and splitting is repeated on any new FF and BB edges produced in this step. Next, contour insertion is performed on all FB edges. As such each edge separating a front-facing vertex from a back-facing vertex becomes part of the occluding contour. Occluding contour manager 108 then performs root-finding within each contour triangle to find cusps. If a cusp is detected very close to an existing vertex, that vertex is tagged as a cusp vertex. If a cusp is detected elsewhere in the interior of a triangle, the cusp is inserted as a vertex, replacing the triangle with three triangles. One of these new triangles will be CCC, which is resolved using an edge flip.

The above procedure can sometimes produce singularities in the contour generator that are not detected as cusps. These singularity vertices can be detected as described below. To test whether contour vertex w is a singularity, the occluding contour manager 108 bidirectionally traces along the occluding contour to find two nearby contour vertices v and x. If the image space angle of the triangle vwx is less than $\pi/3$, then the w is marked as a singular vertex. This was found to generally be more accurate than using cusp vertices.

At numeral 3, the initial mesh is provided to object preparation manager 110. At numeral 4, object preparation manager is responsible for identifying and removing twists and holes and labeling cusps. For example, the object preparation manager 110 can detect intersection vertices that correspond to a twisted surface. In some embodiments, once a loop has been detected, then it can be removed. Holes may be removed using a cut-to-disk algorithm (such as described in Xianfeng Gu, Steven Gortler, and Hugues Hoppe. 2002. Geometry Images. ACM Trans. Graphics 21, 3 (2002)). In some embodiments, a cut is a set of mesh edges. Adding cuts to the region boundary produces a new region without holes, where the new boundary of the region traverses each cut twice. However, the mesh $\mathcal{M}$ does not have the same occluding contours as $\mathcal{C}$. As a result, some possible cuts are invalid, for example, they may pass outside the outside of the region in image space. These problems generally appear near inconsistent triangles, where an inconsistent triangle is one that is front-facing in a region that should be back-facing or vice-versa. To address this problem, embodiments identify a set of edges where the cut should not go through. These may include any edge adjacent to any inconsistent face, any edge adjacent to a cusp, or any edge that intersects a nearby contour in image-space. To accommodate these restrictions, the cut-to-disk algorithm is modified such that the initial seeds are all faces adjacent to any of the above edges. The connected components of faces are also tracked during region growing. If two regions become adjacent, then they are merged and the edge between them removed rather than becoming part of the cut. Sometimes a cut cannot be found when there is a contour loop surrounded by enough inconsistent faces. But there are still consistent faces that touch the contour at a single vertex each. In such instances, embodiments split the consistent adjacent faces before running the cut algorithm.

In some embodiments, the object preparation manager is also responsible for labeling cusp orientation. For example, each singular vertex (e.g., cusp) may be labeled as to which side of the vertex is singular. In some embodiments, this is performed by computing the discrete Laplacian of the contour loop at cusp vertices in 3D, and then determining which region the Laplacian vector points to. The other region (e.g., the region to which the Laplacian vector does not point) gets a singularity label.

With the occluding contour inserted, twists and holes removed, and cusps labeled, processing proceeds at numeral 5 to triangulation manager 112. At numeral 6, triangulation manager 112 divides the mesh received from object preparation manager 110 into front- and back-facing regions, bounded by a polygon representing the occluding contour. For each region, a boundary polygon is projected by triangulation manager 112 into 2D image space. Triangulation manager 112 then triangulates the polygon in 2D using a triangulation algorithm, such as that described in Ofir Weber and Denis Zorin. Locally injective parametrization with arbitrary fixed boundaries. ACM Transactions on Computer Systems 33, 4 (2014). However, because only contour vertices are used, this triangulation may not capture the interior shape of the surface. The triangulation can then be decomposed into a collection of non-self-overlapping triangles. For example, this simplifies the mesh by removing internal edges, where the internal edge is removed if the union of two sub polygons that share the internal edge results in a simple polygon. The resulting triangulation mesh is then provided to inflation manager 114 at numeral 7.

At numeral 8, inflation manager is responsible for refining the 3D triangulation by inserting new vertices in the interior of each region. This may be applied separately for each non-self-overlapping region identified by triangulation manager 112. Unlike the convex case, where ray tracing may be used to project each vertex of the 2D mesh onto the 3D surface, in the non-convex case ray tracing leads to ambiguities, as the ray may intersect the surface multiple times (e.g., due to the surface overlapping itself). Accordingly, the inflation manager 114 can identify a path connecting two contour vertices. This path is then sampled on the 3D surface, skipping any samples that do not move in the image-space direction of the endpoint. This avoids folds or other features that may lead to inconsistencies. This may be performed a number of times (the more paths that are sampled leads to improved quality of the resulting mesh). Once the samples have been obtained, then a refined triangulation is performed, such as using constrained Delaunay triangulation. The triangulated regions are then stitched together into output mesh 116 at numeral 9.

Figure 2:
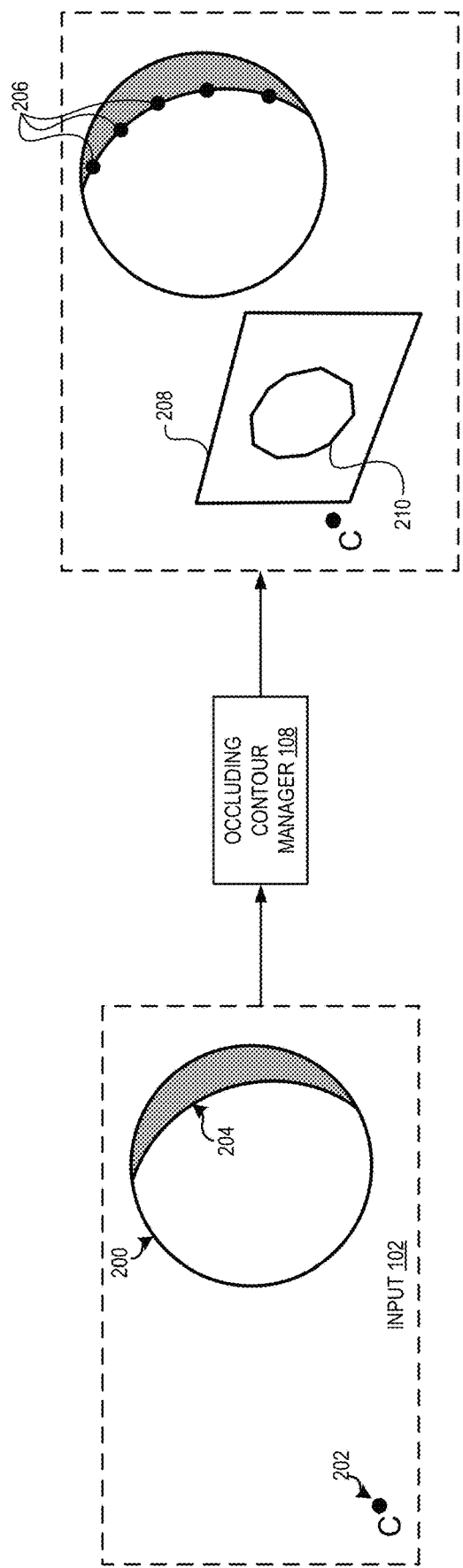
FIG. 2 illustrates a diagram of contour insertion in accordance with one or more embodiments.

FIG. 2 illustrates a diagram of contour insertion in accordance with one or more embodiments. As shown in FIG. 2, the input 102 includes a 3D object 200 and a camera position c 202. In the example of FIG. 2, a simple convex surface is described. This is for simplicity of depiction, as discussed, the techniques described herein may be applied to convex or non-convex surfaces. From the viewpoint of the camera position, occluding contour 204 represents the boundary between the front-facing region and the back-facing region of the input 3D object.

As discussed, this input is received by occluding contour manager 108 which performs contour insertion on the 3D object. For example, a base mesh of the object (e.g., a Catmull-Clark surface) may be subdivided to eliminate non-quad faces, splitting quad faces into triangles, and moving vertices to their limit positions. Each resulting vertex can be labeled as either F or B, depending on whether the corresponding smooth surface point is front- or back-facing. The contour insertion can then be performed by inserting contour vertices (C) on RB edges. The resulting CC edges formed by connecting the contour vertices, such as shown at 206, forms a linear approximation of the occluding contour on the smooth surface input object. The resulting polygon, either a simple polygon for convex objects or a self-overlapping, WSO, or WSO with holes polygon for non-convex objects, can then be projected into image space 208, as shown at 210.

Figure 3:
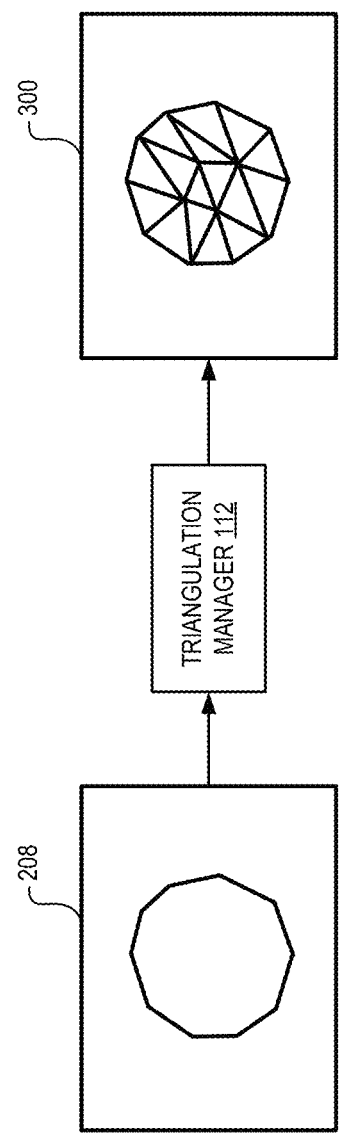
FIG. 3 illustrates a diagram of triangulation in a two-dimensional projection in accordance with one or more embodiments.

FIG. 3 illustrates a diagram of triangulation in a two-dimensional projection in accordance with one or more embodiments. Once the contour has been inserted, the mesh can be partitioned into front-facing and back-facing regions, with each region bounded by a polygon in 3D comprising the contours and/or boundaries surrounding the region. As shown in FIG. 3, the contour polygon can be projected into the 2D image space 208. This can be provided to triangulation manager 112 which is responsible for triangulating the region as shown at 300. Various triangulation techniques may be used. For example, the triangulation techniques for WSO polygons described in Ofir Weber and Denis Zorin. Locally injective parametrization with arbitrary fixed boundaries. ACM Transactions on Computer Systems 33, 4 (2014) (also referred to herein as Weber and Zorin). may be implemented by triangulation manager 112.

Figure 4:
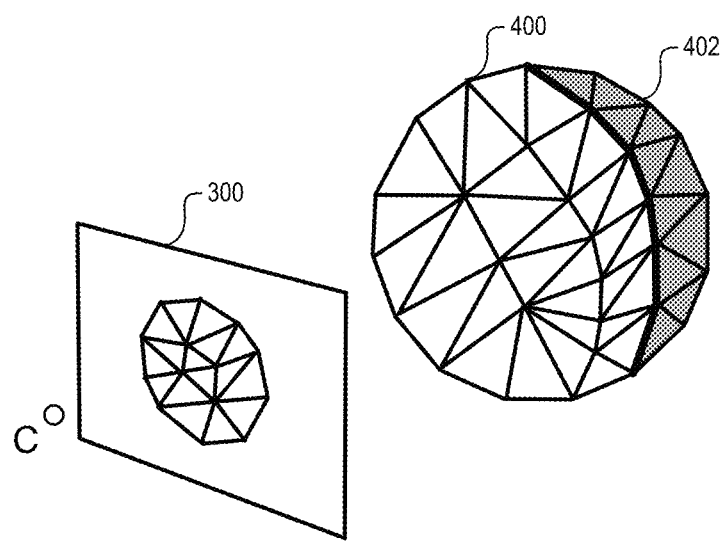
FIG. 4 illustrates a diagram of projecting the two-dimensional triangulation onto the three-dimensional object in accordance with one or more embodiments.

FIG. 4 illustrates a diagram of projecting the two-dimensional triangulation onto the three-dimensional object in accordance with one or more embodiments. Once the regions have been triangulated in 2D image space, as shown at 300, the triangulation is mapped back to the 3D contour polygon. As discussed, each region may be separately triangulated, and the resulting meshes are then stitched together along the contours. For example, as shown in FIG. 4, the front-facing region is triangulated and mapped back to 3D as shown at 400. Likewise, the back-facing region is triangulated and mapped back to 3D as shown at 402. More complicated non-convex objects may have more regions, which are processed similarly and then stitched together along the contours. In some embodiments, the mesh may be simplified by decomposing the triangulation into a collection of non-self-overlapping triangles. This may be performed as described in Weber and Zorin by removing internal edges where the union of two sub polygons that share the edge is a simple polygon.

This resulting mesh has the same topology as the smooth surface, and every point on the mesh corresponds to a surface point, and each mesh point is geometrically close to its corresponding surface point, within a threshold distance. Additionally, the contour partitions the mesh into regions which comprise entirely front-facing triangles or entirely back-facing triangles. However, because only contour vertices are used, this triangulation may not capture the interior shape of the object. As such, to improve the accuracy of the contours obtained using the mesh, the mesh may be refined, as discussed below.

Figure 5:
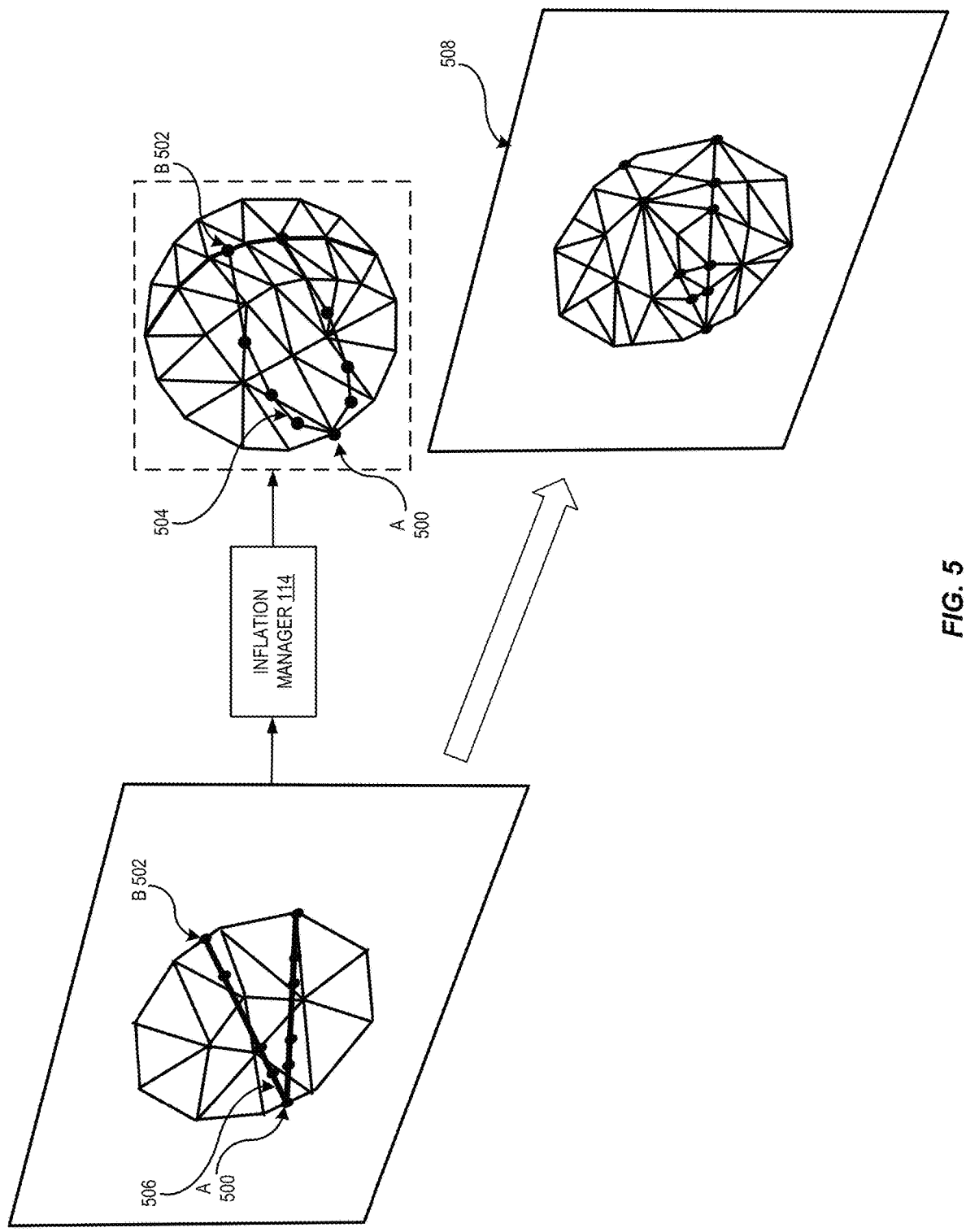
FIG. 5 illustrates a diagram of refining the three-dimensional triangulation in accordance with one or more embodiments.

FIG. 5 illustrates a diagram of refining the three-dimensional triangulation in accordance with one or more embodiments. As shown in FIG. 5, the mesh can be refined by adding new vertices in the interior of each region. This process can be applied separately for each non-self-overlapping region identified during triangulation. Initially, each edge in the 2D polygon connects two contour vertices from the 3D mesh. The inflation manager 114 can find a path on the 3D surface connecting two contour vertices that project to a line including the edge in 2D. If such a path is identified, then the inflation manager 114 marches along the path and periodically produces samples on the 3D surface. This process skips samples that do not move in the image-space direction of the endpoint in image space. This avoids any folds due to inconsistencies.

For example, any pair of points on the contour may be selected, such as points A 500 and B 502. In this example, a path 504 over the surface is then traversed which corresponds to a straight-line path 506 in image space. After a sample $v_i$ is inserted then the next sample $v_{i+1}$ is inserted only if $(v_{i+1}-v_i)\cdot(b-a)>0$. In some embodiments, samples are also skipped if they are within a threshold distance of an existing vertex in the mesh. This process may be repeated for each edge. In some embodiments, multiple traversals connecting different pairs of points may be performed to increase the number of samples, improving the quality of the resulting refined mesh.

This produces a new set of 2D/3D sample points within the polygon. The triangulation is then computed using constrained Delaunay triangulation (CDT) on these sample points and the bounding polygon in 2D, resulting in refined mesh 508. In some embodiments, if a path is not found between edges in the original polygon, then a large (e.g., five-ring) neighborhood is identified around one of the endpoints. Delaunay edge flipping may then be applied for all edges within the neighborhood, which effectively removes long edges.

In some embodiments, this may result in CCC triangles (e.g., triangles where each vertex lies on a contour edge). Such triangles are not valid and, in practice, may cause problems when two adjacent regions have triangles with the same vertices. For each CCC triangle, an edge may be randomly picked between two vertices that is not a contour edge, split, and then the new vertex is perturbed toward the camera (for front-facing regions) or away from the camera (for back-facing regions).

This may be performed for each region identified during triangulation, resulting in multiple refined meshes. The refined meshes for all of the regions can then be stitched together to create the mesh for the entire input shape. The occluding contours of this resulting surface correspond to the occluding contours of the original input object. This mesh can then be used to generate a line drawing, vector graphic, or other representation of the occluding contours.

Figure 6:
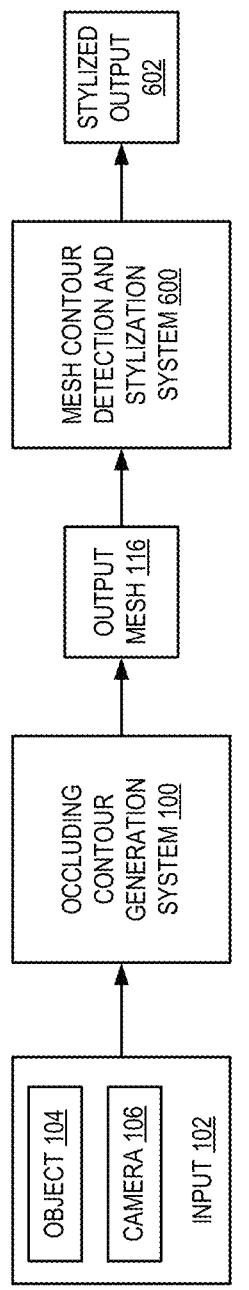
FIG. 6 illustrates a diagram of a process of computing a stylized output based on accurate smooth occluding contours of a three-dimensional object in accordance with one or more embodiments.

FIG. 6 illustrates a diagram of a process of computing a stylized output based on accurate smooth occluding contours of a three-dimensional object in accordance with one or more embodiments. As discussed above, occluding contour generation system 100 can be used to determine the visible occluding contours of a 3D object. The occluding contour generation system 100 computes output mesh 116 which has been divided into regions separated by occluding contours. The occluding contours of the output mesh 116 correspond to the occluding contours of the input 3D object from the input camera viewpoint, as discussed above.

Accordingly, the output mesh 116 can be provided to mesh contour detection and stylization system 600 to generate a stylized output 602. In various embodiments, mesh contour detection and stylization system 600 may implement one or more contour detection and/or stylization algorithms. For example, the mesh contour detection and stylization system 600 may be implemented as a rendering engine for rendering non-photorealistic line drawings from 3D scenes, such as a rendering engine based on Freestyle, or other rendering engine. In some embodiments, the mesh contour detection and stylization system 600 may implement a mesh to path algorithm that converts the contours of the output mesh into path objects which can be edited in a vector graphics editor. In some embodiments, the mesh contour detection and stylization system 600 and the occluding contour generation system 100 may be implemented as part of an image processing application and/or suite of image processing applications. The stylized output 602 may include a line drawing stylized according to the user's preferences, a path object, or other representation of the contours of the input 3D object as represented in output mesh 116.

Figure 7A:
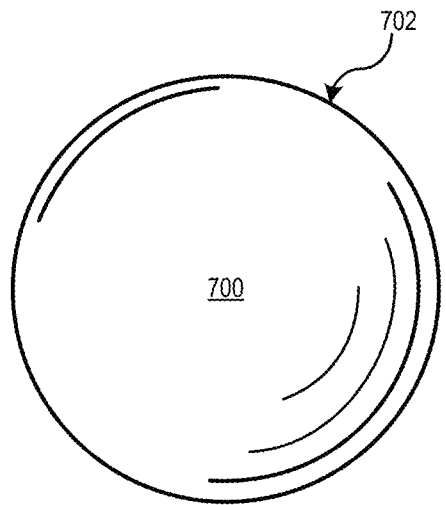
FIGS. 7A-7D illustrate an example of regions of a convex object in accordance with one or more embodiments.
Figure 7B:
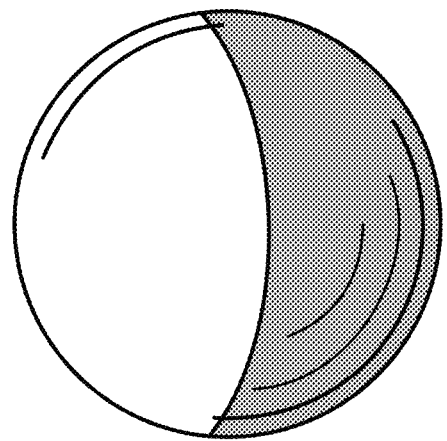
Figure 7C:
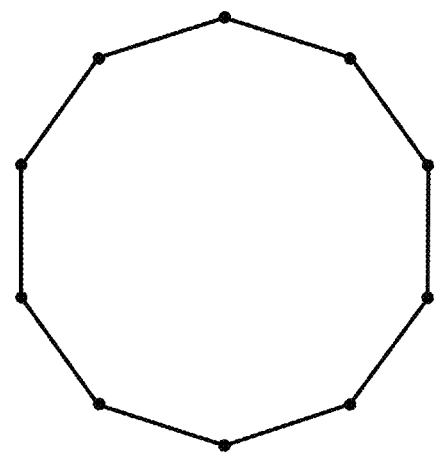
Figure 7D:
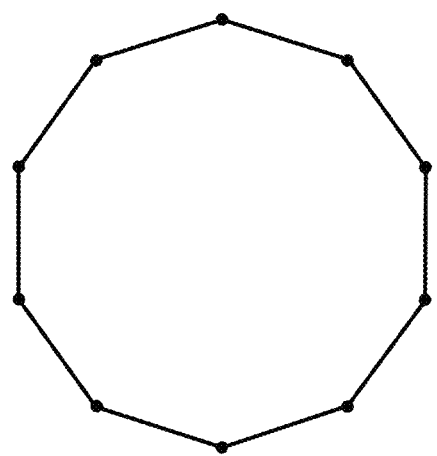

FIGS. 7A-7D illustrate an example of regions of a convex object in accordance with one or more embodiments. As shown in FIG. 7A, sphere 700, a convex object, appears to be circle when viewed from the camera viewpoint. The boundary circle 702 represents the occluding contour of the object. Beyond this contour, the back-facing portion of the object is hidden by the front-facing portion of the object. This is depicted in the side view of sphere 700 in FIG. 7B, where the darkened portion of the object represents the back-facing portion, and the light portion of the object represents the front-facing portion. The contour can then be computed and is represented by a polygon shown in FIG. 7C. As the convex object is a sphere in this example, the side view also results in a similar polygon as shown in FIG. 7D.

Figure 8A:
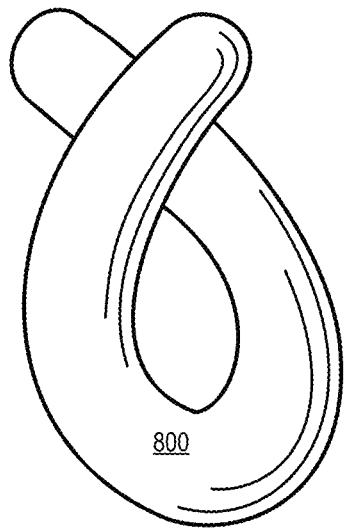
FIGS. 8A-8D illustrate an example of regions of a self-overlapping object in accordance with one or more embodiments.
Figure 8B:
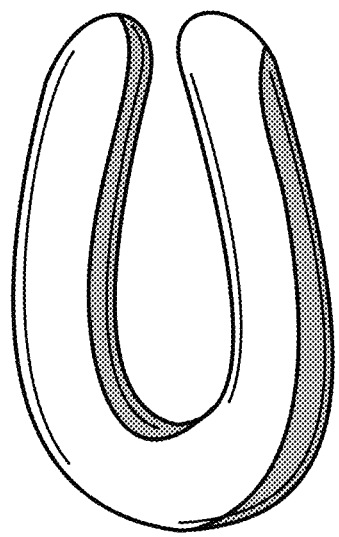
Figure 8C:
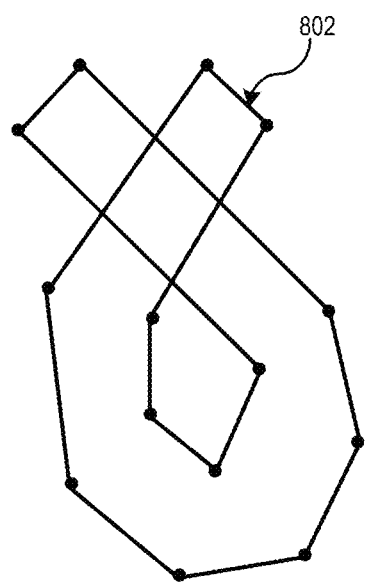
Figure 8D:
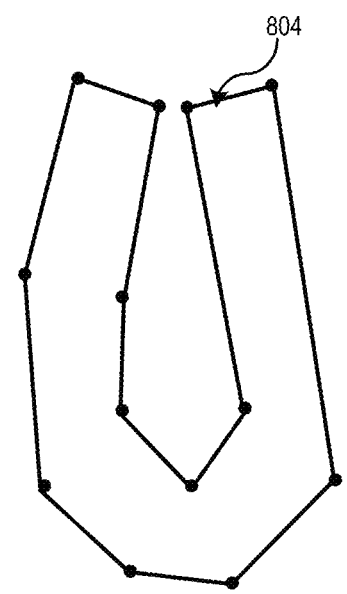

FIGS. 8A-8D illustrate an example of regions of a self-overlapping object in accordance with one or more embodiments. As shown in FIG. 8A, a self-overlapping object 800 occurs when one part of the object occludes a different part of the object. The side view of the self-overlapping object 800 is shown in FIG. 8B. As in FIG. 7B, in FIG. 8B the darkened portion of the object represents the back-facing portion, and the light portion of the object represents the front-facing portion. As such, one lobe of object 800 occludes the other lobe. This results in self-overlapping polygon 802, as shown in FIG. 8C. The self-overlapping polygon 802 represents the occluding contour of the object from the camera's viewpoint. The sideview of the object 800 results in polygon 804, as shown in FIG. 8D.

FIGS. 9A-9D illustrate an example of regions of a weakly self-overlapping object in accordance with one or more embodiments. As shown in FIG. 9A, a weakly self-overlapping (WSO) object 900 occurs when a cusp in the object results in a singularity being produced in the contour. For example, object 900 includes two lobes 902 and 904 which are more clearly shown in FIG. 9B. When the object is viewed from the camera perspective, as shown in FIG. 9A, the surface folds back on itself which causes the curve to be occluded by local geometry. This results in a singularity in the occluding contour polygon 908 shown in FIG. 9C. The side view of the WSO object 900 is shown in FIG. 9B. As in FIGS. 7B and 8B, in FIG. 9B the darkened portion of the object represents the back-facing portion, and the light portion of the object represents the front-facing portion. The sideview of the WSO object 900 results in polygon 910, as shown in FIG. 9D. This case can be triangulated b using a triangulation algorithm, such as that described in Ofir Weber and Denis Zorin. Locally injective parametrization with arbitrary fixed boundaries. ACM Transactions on Computer Systems 33, 4 (2014), which takes the polygon with labeled singularities as input. After triangulation, at each singularity, two adjacent triangles of the tessellation will overlap in image space.

FIGS. 10A-10D illustrate an example of regions of a weakly self-overlapping object with holes in accordance with one or more embodiments. As shown in FIG. 10A, the WSO object with holes 1000 has a raised portion in the center surrounded by a curved lip. This results in holes. As discussed, a cut-to-disk algorithm may be used to add cuts to the region boundaries, producing new regions without holes. As shown in FIG. 10B, the darkened portion of the object represents the back-facing portion, and the light portion of the object represents the front-facing portion. Because of the holes introduced by the lip, occluding contour polygon 1002 is computed as shown in FIG. 10C. Polygon 1004 is computed from the side view as shown in FIG. 10D.

Figure 11:
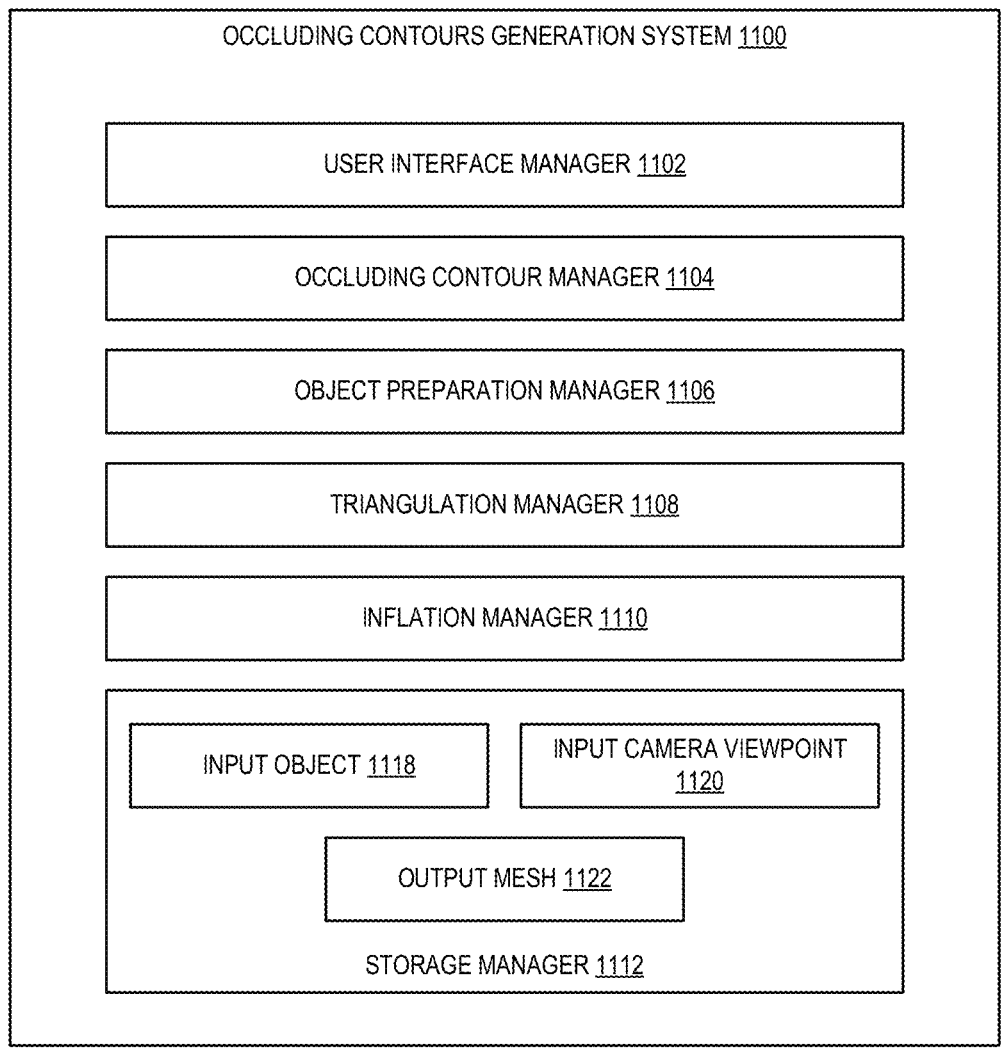
FIG. 11 illustrates a schematic diagram of an occluding contours generation system in accordance with one or more embodiments.

FIG. 11 illustrates a schematic diagram of occluding contours generation system (e.g., "occluding contours generation system" described above) in accordance with one or more embodiments. As shown, the occluding contours generation system 1100 may include, but is not limited to, user interface manager 1102, occluding contour manager 1104, object preparation manager 1106, triangulation manager 1108, inflation manager 1110, and storage manager 1112.

The occluding contours generation system 1100 includes a user interface manager 1102 that allows users to provide input to, and receive output from, the occluding contours generation system 1100. For example, the user interface manager 1102 allows users to select a 3D object and a camera viewpoint to be used to compute the 3D object's occluding contours. In some embodiments, the user interface manager 1102 enables a user to select one or more 3D object files stored or accessible by storage manager 1112. Additionally, the user interface manager 1102 allows users to request the occluding contours generation system to compute the occluding contours for the 3D object from multiple viewpoints and/or with the model in different positions. For example, an animated view of the 3D model may include a changing camera viewpoint during the animation as well as the movement of the 3D model in space. The camera viewpoint of each frame of animation may be extracted and the occluding contours of the model in the position it is in that frame may be computed. Further, the user interface manager 1102 allows the output mesh to be returned to the user (e.g., rendered on a display) or provided to another system indicated by the user, such as a mesh contour detection and stylization system which can then render line drawings, path objects, etc. based on the contour(s) of the 3D object.

As illustrated in FIG. 11, the occluding contours generation system 1100 also includes occluding contour manager 1104. As discussed, occluding contour manager 1104 is responsible for generating an initial mesh for the input 3D object 1118. The vertices of the initial mesh can be labeled as front-facing or back-facing, based on the camera viewpoint. The occluding contour manager 1104 can then insert the occluding contour by adding contour vertices to the initial mesh. For example, in some embodiments, edges connecting a front-facing vertex and a back-facing vertex are identified and a contour vertex is inserted on the edge.

In some embodiments, the location of the contour vertex on the edge is identified by assigning a normal vector to each vertex of the initial mesh. This may be performed generally as described in Pierre Bénard and Aaron Hertzmann. 2019. Line Drawings from 3D Models. Foundations and Trends in Computer Graphics and Vision 11, 1-2 (2019). For example, the normal vector may be a weighted average of the normals of the faces adjacent to a particular vertex, where the weighting is based on the area of the adjacent triangles. In various embodiments, alternative weightings may be used. This may be expressed as:

$$\hat{n}_i = \frac{\Sigma_{j \in N(i)} A_j n_j}{\Sigma_{j \in N(i)} A_j}$$

where $\hat{n}_i$ is the normal of vertex i, $A_j$ is the area of adjacent triangle j, N(i) is the one-ring face neighborhood of vertex i, and $n_j$ is the weighted average of the normals of the adjacent faces. In some embodiments, the normal vector may be normalized to be a unit vector:

$$n_i = \frac{\hat{n}_i}{\|\hat{n}_i\|}$$

An orientation function, g, for a particular point, $p_i$, can be defined based on the camera viewpoint location as:

$$g(p_i) = (p_i - c) \cdot n_i$$

A vertex with g(p)>0 is front-facing, a vertex with g(p)<0 is back-facing. The orientation function can then be defined over the entire face of the triangle using linear interpolation. Any face that has opposite signs at two vertices includes a contour which may then be identified based on the orientation function values on the face. For example, on an edge between two vertices, i and j, the linear interpolation can be expressed as:

$$g(t) = (1-t)g(p_i) + tg(p_j)$$

A contour can be identified as crossing an edge when the sign of $g(p_i)$ is the opposite of $g(p_j)$. By solving for g(t)=0, the position of the contour can be determined to be:

$$t = \frac{g(p_i)}{g(p_i) - g(p_j)}$$

$$p(t) = (1-t)p_i + tp_j = \frac{g(p_i)p_i - g(p_j)p_j}{g(p_i) - g(p_j)}$$

Accordingly, contour positions can be identified across the 3D object and points along the contour can be inserted into the mesh. For example, all or portions of the faces of the mesh can be analyzed to identify contour points, as discussed above, and then the contour points may be added and labeled as contour points in the mesh. With the sampled contour points added to the mesh, the object preparation manager 1106 can then analyze the mesh and the contour to determine if any additional processing is required to prepare for triangulation.

As illustrated in FIG. 11, the occluding contours generation system 1100 also includes object preparation manager 1106. As discussed, object preparation manager 1106 is responsible for identifying and removing twists and holes, and labeling cusps. For example, the object preparation manager 110 can detect intersection vertices that correspond to a twisted surface. In some embodiments, once a loop has been detected, then it can be removed from the contour. Holes may be removed using a cut-to-disk algorithm (such as described in Xianfeng Gu, Steven Gortler, and Hugues Hoppe. 2002. Geometry Images. ACM Trans. Graphics 21, 3 (2002)), as discussed above. Additionally, object preparation manager 1106 can detect and label cusps in the initial mesh.

As illustrated in FIG. 11, the occluding contours generation system 1100 also includes triangulation manager 1108. With the contour inserted into the mesh, and any twists, holes, and cusps accounted for, the triangulation manager can then partition the 3D object's initial mesh into regions, including at least one front-facing region and at least one back-facing region. Each region is bounded by a polygon formed by the contour points that were inserted previously. This boundary polygon can be projected into a 2D image plane and then triangulated. In various embodiments, the triangulation manager may implement one or more triangulation algorithms to perform triangulation. For example, the triangulation method of Weber and Zorin (e.g., Ofir Weber and Denis Zorin. Locally injective parametrization with arbitrary fixed boundaries. ACM Transactions on Computer Systems 33, 4 (2014)), may be used. This generates an initial valid mesh, in which front-facing triangles and back-facing triangles are consistent (e.g., a triangle is consistent if it has the same orientation as the region it lies in: a triangle in the front-facing region is consistent if and only if the triangle is front-facing and a triangle in the back-facing region is consistent if and only if the triangle is back-facing). In some embodiments, the triangulation can be decomposed into a collection of non-self-overlapping triangles (e.g., by removing internal edges, where the union of the triangles that share that edge is a simple polygon).

As illustrated in FIG. 11, the occluding contours generation system 1100 also includes inflation manager 1110. Once the triangle mesh has been generated in the 2D image plane, it needs to be mapped to the 3D object. Additionally, the mesh can be refined to include additional interior vertices that better capture the surface of the 3D object. To do so, the inflation manager 1110 first refines the triangulation by sampling additional points on the 3D object and adding them to the polygon in the 2D image plane. For example, the inflation manager 1110 can identify a path connecting two contour vertices. This may include a path on the 3D object corresponding to the edge in 2D space that connects the 2D vertices. Additionally, or alternatively, this may include a path across the 3D object connecting two vertices that are not directly connected by an edge. This path is then sampled on the 3D surface, skipping any samples that do not move in the image-space direction of the endpoint. This avoids folds or other features that may lead to inconsistencies. This may be performed a number of times (the more paths that are sampled leads to improved quality of the resulting mesh). Once the samples have been obtained, then a refined triangulation, such as using constrained Delaunay triangulation, is performed on the original vertices and the sample points. The inflation manager 1110 performs this refined triangulation for each region of the 3D object. The triangulated regions are then stitched together to generate the output mesh.

As illustrated in FIG. 11, the occluding contours generation system 1100 also includes the storage manager 1112. The storage manager 1112 maintains data for the occluding contours generation system 1100. The storage manager 1112 can maintain data of any type, size, or kind as necessary to perform the functions of the occluding contours generation system 1100. The storage manager 1112, as shown in FIG. 11, includes the input object 1118. The input object 1118 can include a 3D object, such as a Catmull-Clark subdivision surface or other smooth surface, as discussed in additional detail above. As further illustrated in FIG. 11, the storage manager 1112 also includes input camera viewpoint data 1120. Input camera viewpoint data 1120 can include camera position information for any 3D model utilized by the occluding contours generation system 1100. For example, input camera viewpoint data 1120 can include a position in space representing the location of the camera. The position may be defined with respect to a global or local reference frame, relative to the 3D object, or other reference frame. The storage manager 1110 may also include output mesh data 1122. The output mesh data 1122 may be generated by inflation manager 1110, as discussed above, by stitching together the meshes generated for a plurality of regions of the 3D object. As a result, the triangles in the output mesh are consistent (e.g., a triangle is consistent if it has the same orientation as the region it lies in: a triangle in the front-facing region is consistent if and only if the triangle is front-facing, etc.). As discussed, this output mesh data can be provided to a rendering engine (e.g., a mesh contour detection and stylization system) which then renders a line drawing, generates a path object, etc. based on the occluding contours of the output mesh.

Each of the components 1104-1112 of the occluding contours generation system 1100 and their corresponding elements (as shown in FIG. 11) may be in communication with one another using any suitable communication technologies. It will be recognized that although components 1104-1112 and their corresponding elements are shown to be separate in FIG. 11, any of components 1104-1112 and their corresponding elements may be combined into fewer components, such as into a single facility or module, divided into more components, or configured into different components as may serve a particular embodiment.

The components 1104-1112 and their corresponding elements can comprise software, hardware, or both. For example, the components 1104-1112 and their corresponding elements can comprise one or more instructions stored on a computer-readable storage medium and executable by processors of one or more computing devices. When executed by the one or more processors, the computer-executable instructions of the occluding contours generation system 1100 can cause a client device and/or a server device to perform the methods described herein. Alternatively, the components 1104-1112 and their corresponding elements can comprise hardware, such as a special purpose processing device to perform a certain function or group of functions. Additionally, the components 1104-1112 and their corresponding elements can comprise a combination of computer-executable instructions and hardware.

Furthermore, the components 1104-1112 of the occluding contours generation system 1100 may, for example, be implemented as one or more stand-alone applications, as one or more modules of an application, as one or more plug-ins, as one or more library functions or functions that may be called by other applications, and/or as a cloud-computing model. Thus, the components 1104-1112 of the occluding contours generation system 1100 may be implemented as a stand-alone application, such as a desktop or mobile application. Furthermore, the components 1104-1112 of the occluding contours generation system 1100 may be implemented as one or more web-based applications hosted on a remote server. Alternatively, or additionally, the components of the occluding contours generation system 1100 may be implemented in a suit of mobile device applications or "apps." To illustrate, the components of the occluding contours generation system 1100 may be implemented in a digital design application, or suite of applications, including but not limited to ADOBE CREATIVE CLOUD, ADOBE PHOTOSHOP, ADOBE ACROBAT, ADOBE ILLUSTRATOR, ADOBE LIGHTROOM and ADOBE INDESIGN. "ADOBE", "CREATIVE CLOUD," "PHOTOSHOP," "ACROBAT," "ILLUSTRATOR," "LIGHTROOM," and "INDESIGN" are either registered trademarks or trademarks of Adobe Inc. in the United States and/or other countries.

Figure 12:
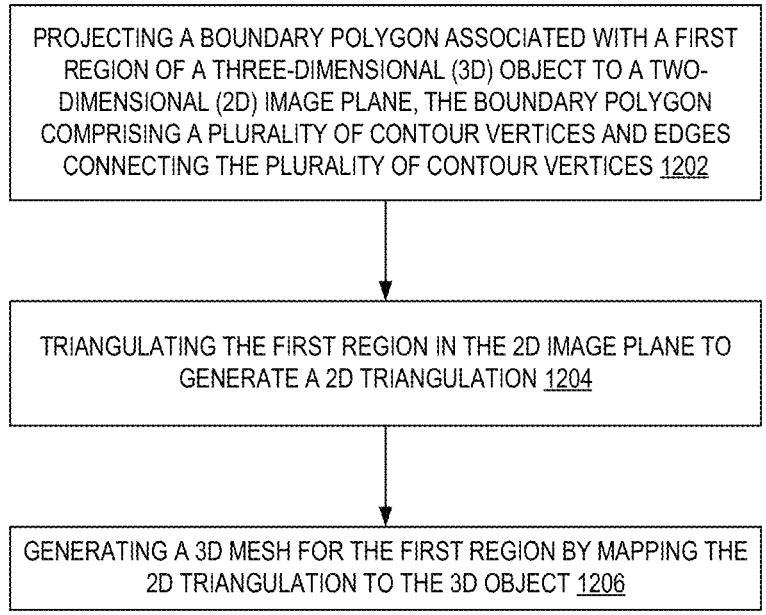
FIG. 12 illustrates a flowchart of a series of acts in a method of computing accurate smooth occluding contour in accordance with one or more embodiments.

FIGS. 1-11, the corresponding text, and the examples, provide a number of different systems and devices that enables computation of accurate smooth occluding contours. In addition to the foregoing, embodiments can also be described in terms of flowcharts comprising acts and steps in a method for accomplishing a particular result. For example, FIG. 12 illustrates a flowchart of an exemplary method in accordance with one or more embodiments. The method described in relation to FIG. 12 may be performed with fewer or more steps/acts or the steps/acts may be performed in differing orders. Additionally, the steps/acts described herein may be repeated or performed in parallel with one another or in parallel with different instances of the same or similar steps/acts.

FIG. 12 illustrates a flowchart 1200 of a series of acts in a method of computing accurate smooth occluding contours in accordance with one or more embodiments. In one or more embodiments, the method 1200 is performed in a digital medium environment that includes the occluding contours generation system 1100. The method 1200 is intended to be illustrative of one or more methods in accordance with the present disclosure and is not intended to limit potential embodiments. Alternative embodiments can include additional, fewer, or different steps than those articulated in FIG. 12.

As illustrated in FIG. 12, the method 1200 includes an act 1202 of projecting a boundary polygon associated with a first region of a three-dimensional (3D) object to a two-dimensional (2D) image plane, the boundary polygon comprising a plurality of contour vertices and edges connecting the plurality of contour vertices. As discussed, the 3D object may be a smooth surface, such as a such as a Catmull-Clark subdivision surface or other smooth surface. In some embodiments, the 3D object is a self-overlapping object, a weakly self-overlapping object, or a weakly self-overlapping object with one or more holes.

As illustrated in FIG. 12, the method 1200 also includes an act 1204 of triangulating the first region in the 2D image plane to generate a 2D triangulation. In some embodiments, generating a 3D mesh for the first region by mapping the 2D triangulation to the 3D object, further includes selecting a first contour vertex and a second contour vertex, identifying a path connecting on the 3D object connecting the first contour vertex to the second contour vertex, generating sample points along the path on the 3D object, and generating a refined 2D triangulation using the contour vertices and the sample points. In some embodiments, generating sample points along the path on the 3D object, further includes adding the sample points that were generated on the path in a direction of travel from the first contour vertex to the second contour vertex, and discarding the sample points that were generated on the path in a direction of travel from the second contour vertex to the first contour vertex.

As illustrated in FIG. 12, the method 1200 also includes an act 1204 generating a 3D mesh for the first region by mapping the 2D triangulation to the 3D object. In some embodiments, this may be repeated for each region of the 3D object. For example, in some embodiments, the method further includes iteratively generating a 3D mesh for each remaining region of the 3D object by projecting a boundary polygon associated with that region to the 2D image plane, triangulating that region in the 2D image plane to generate a 2D triangulation, and mapping the 2D triangulation for that region to the 3D object. Once the triangulation has been performed for each region, an output mesh can be generated by stitching the regions together along the contour. For example, in some embodiments, the method further includes generating an output mesh by combining each 3D mesh corresponding to each region.

As discussed, the output mesh can be used to create various representations of the contours of the 3D model, such as stylized line drawings, path objects, etc. For example, in some embodiments, the method further includes providing the output mesh to a mesh contour detection and stylization system, wherein the mesh contour detection and stylization system generates a stylized line drawing based on the output mesh and a user-indicated style, and causing the stylized line drawing to be returned to the user. In some embodiments, the method further includes providing the output mesh to a mesh contour detection and stylization system, wherein the mesh contour detection and stylization system generates a path object corresponding to an occluding contour of the output mesh, and causing the path object to be returned to a user.

In some embodiments, the method further includes receiving a request to generate occluding contours for the 3D object, the request including the 3D object and a viewpoint, inserting contour vertices into an initial mesh of the 3D object, the contour vertices corresponding to at least one occluding contour on the 3D object, and partitioning the 3D object into a plurality of regions based at least on the contour vertices.

Figure 13:
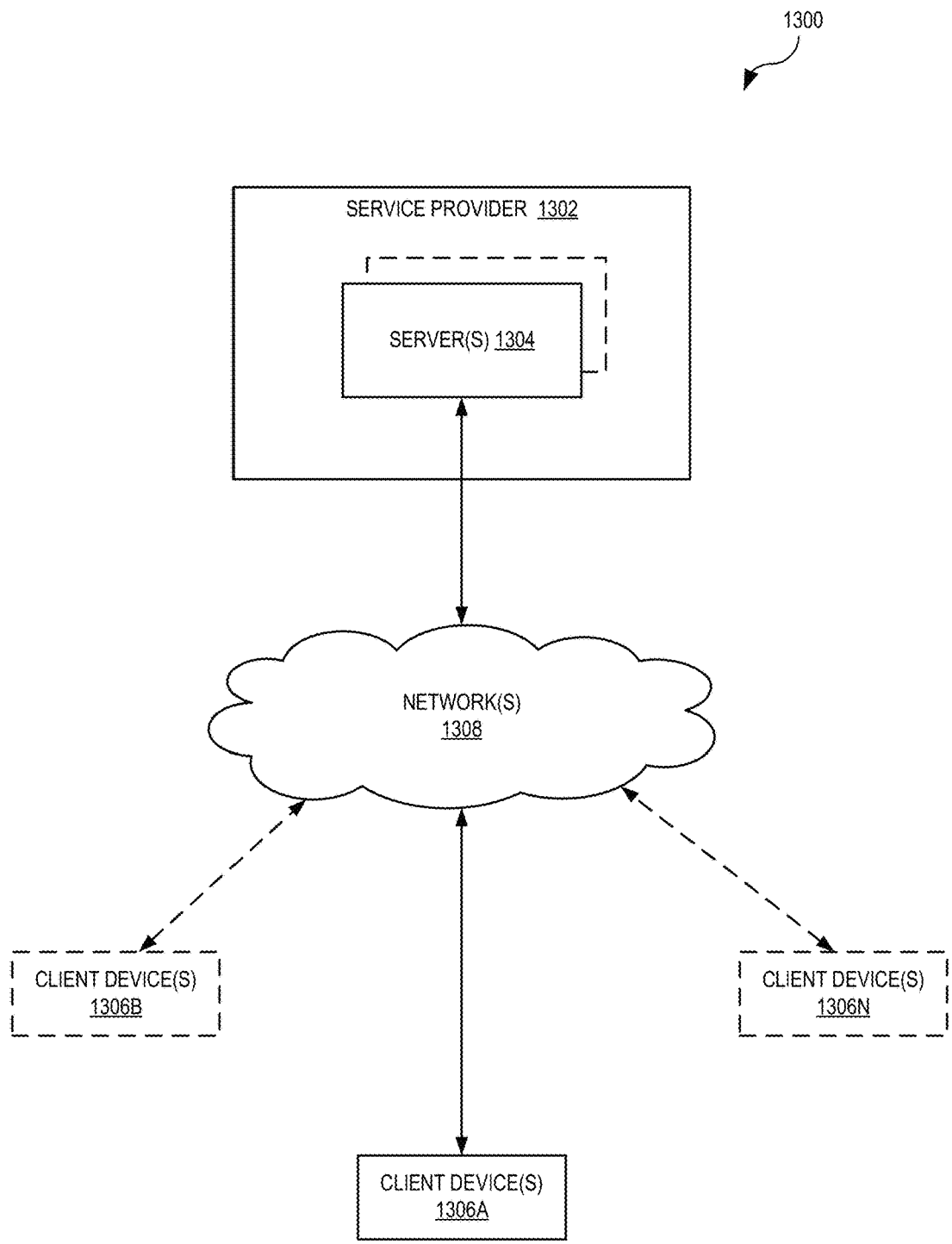
FIG. 13 illustrates a schematic diagram of an exemplary environment in which the image processing system can operate in accordance with one or more embodiments.

FIG. 13 illustrates a schematic diagram of an exemplary environment 1300 in which the occluding contours generation system 1100 can operate in accordance with one or more embodiments. In one or more embodiments, the environment 1300 includes a service provider 1302 which may include one or more servers 1304 connected to a plurality of client devices 1306A-1306N via one or more networks 1308. The client devices 1306A-1306N, the one or more networks 1308, the service provider 1302, and the one or more servers 1304 may communicate with each other or other components using any communication platforms and technologies suitable for transporting data and/or communication signals, including any known communication technologies, devices, media, and protocols supportive of remote data communications, examples of which will be described in more detail below with respect to FIG. 14.

Although FIG. 13 illustrates a particular arrangement of the client devices 1306A-1306N, the one or more networks 1308, the service provider 1302, and the one or more servers 1304, various additional arrangements are possible. For example, the client devices 1306A-1306N may directly communicate with the one or more servers 1304, bypassing the network 1308. Or alternatively, the client devices 1306A-1306N may directly communicate with each other. The service provider 1302 may be a public cloud service provider which owns and operates their own infrastructure in one or more data centers and provides this infrastructure to customers and end users on demand to host applications on the one or more servers 1304. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1304. In some embodiments, the service provider may be a private cloud provider which maintains cloud infrastructure for a single organization. The one or more servers 1304 may similarly include one or more hardware servers, each with its own computing resources, which are divided among applications hosted by the one or more servers for use by members of the organization or their customers.

Similarly, although the environment 1300 of FIG. 13 is depicted as having various components, the environment 1300 may have additional or alternative components. For example, the environment 1300 can be implemented on a single computing device with the occluding contours generation system 1100. In particular, the occluding contours generation system 1100 may be implemented in whole or in part on the client device 1302A.

As illustrated in FIG. 13, the environment 1300 may include client devices 1306A-1306N. The client devices 1306A-1306N may comprise any computing device. For example, client devices 1306A-1306N may comprise one or more personal computers, laptop computers, mobile devices, mobile phones, tablets, special purpose computers, TVs, or other computing devices, including computing devices described below with regard to FIG. 14. Although three client devices are shown in FIG. 13, it will be appreciated that client devices 1306A-1306N may comprise any number of client devices (greater or smaller than shown).

Moreover, as illustrated in FIG. 13, the client devices 1306A-1306N and the one or more servers 1304 may communicate via one or more networks 1308. The one or more networks 1308 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1308 may be any suitable network over which the client devices 1306A-1306N may access service provider 1302 and server 1304, or vice versa. The one or more networks 1308 will be discussed in more detail below with regard to FIG. 14.

In addition, the environment 1300 may also include one or more servers 1304. The one or more servers 1304 may generate, store, receive, and transmit any type of data, including input 3D object data 1118, input camera viewpoint data 1120, output mesh data 1122, or other information. For example, a server 1304 may receive data from a client device, such as the client device 1306A, and send the data to another client device, such as the client device 1302B and/or 1302N. The server 1304 can also transmit electronic messages between one or more users of the environment 1300. In one example embodiment, the server 1304 is a data server. The server 1304 can also comprise a communication server or a web-hosting server. Additional details regarding the server 1304 will be discussed below with respect to FIG. 14.

As mentioned, in one or more embodiments, the one or more servers 1304 can include or implement at least a portion of the occluding contours generation system 1100. In particular, the occluding contours generation system 1100 can comprise an application running on the one or more servers 1304 or a portion of the occluding contours generation system 1100 can be downloaded from the one or more servers 1304. For example, the occluding contours generation system 1100 can include a web hosting application that allows the client devices 1306A-1306N to interact with content hosted at the one or more servers 1304. To illustrate, in one or more embodiments of the environment 1300, one or more client devices 1306A-1306N can access a webpage supported by the one or more servers 1304. In particular, the client device 1306A can run a web application (e.g., a web browser) to allow a user to access, view, and/or interact with a webpage or website hosted at the one or more servers 1304.

Upon the client device 1306A accessing a webpage or other web application hosted at the one or more servers 1304, in one or more embodiments, the one or more servers 1304 can provide access to one or more digital images (e.g., the input image data 1112, such as camera roll or an individual's personal photos) stored at the one or more servers 1304. Moreover, the client device 1306A can receive a request (i.e., via user input) to compute occluding contours for an input 3D object and camera viewpoint and provide the request to the one or more servers 1304. Upon receiving the request, the one or more servers 1304 can automatically perform the methods and processes described above to compute the occluding contours. The one or more servers 1304 can provide an output mesh of the 3D object which accurately represents the occluding contours, as discussed above, to the client device 1306A for display to the user or for further processing by other systems, such as a mesh contour detection and stylization system which can generate a stylized line drawing, a path object, or other representation of the 3D object using the output mesh.

As just described, the occluding contours generation system 1100 may be implemented in whole, or in part, by the individual elements 1302-1308 of the environment 1300. It will be appreciated that although certain components of the occluding contours generation system 1100 are described in the previous examples with regard to particular elements of the environment 1300, various alternative implementations are possible. For instance, in one or more embodiments, the occluding contours generation system 1100 is implemented on any of the client devices 1306A-N. Similarly, in one or more embodiments, the occluding contours generation system 1100 may be implemented on the one or more servers 1304. Moreover, different components and functions of the occluding contours generation system 1100 may be implemented separately among client devices 1306A-1306N, the one or more servers 1304, and the network 1308.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
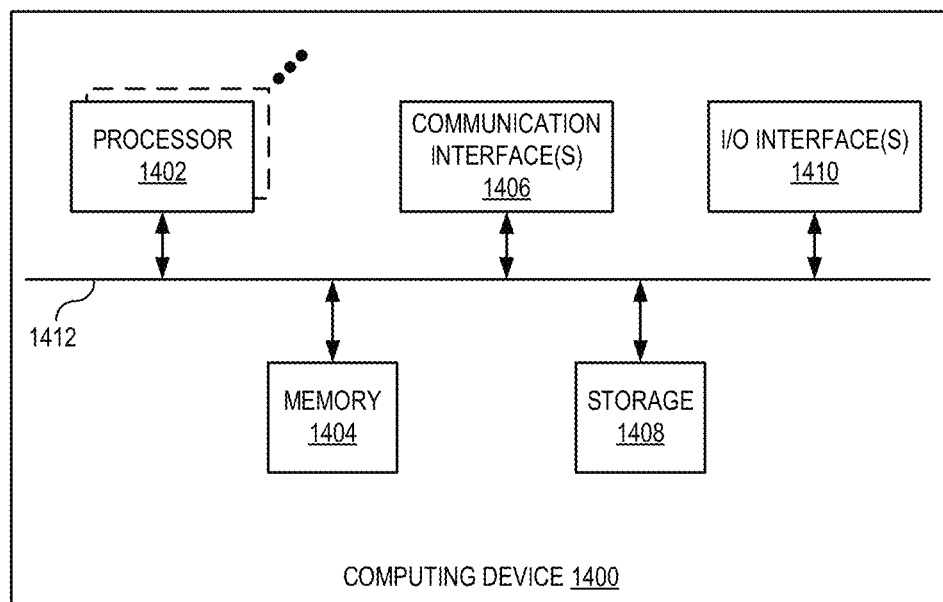
FIG. 14 illustrates a block diagram of an exemplary computing device in accordance with one or more embodiments.

FIG. 14 illustrates, in block diagram form, an exemplary computing device 1400 that may be configured to perform one or more of the processes described above. One will appreciate that one or more computing devices such as the computing device 1400 may implement the image processing system. As shown by FIG. 14, the computing device can comprise a processor 1402, memory 1404, one or more communication interfaces 1406, a storage device 1408, and one or more I/O devices/interfaces 1410. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1408 and decode and execute them. In various embodiments, the processor(s) 1402 may include one or more central processing units (CPUs), graphics processing units (GPUs), field programmable gate arrays (FPGAs), systems on chip (SoC), or other processor(s) or combinations of processors.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1404 may be internal or distributed memory.

The computing device 1400 can further include one or more communication interfaces 1406. A communication interface 1406 can include hardware, software, or both. The communication interface 1406 can provide one or more interfaces for communication (such as, for example, packet-based communication) between the computing device and one or more other computing devices 1400 or one or more networks. As an example and not by way of limitation, communication interface 1406 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

The computing device 1400 includes a storage device 1408 includes storage for storing data or instructions. As an example, and not by way of limitation, storage device 1408 can comprise a non-transitory storage medium described above. The storage device 1408 may include a hard disk drive (HDD), flash memory, a Universal Serial Bus (USB) drive or a combination these or other storage devices. The computing device 1400 also includes one or more input or output ("I/O") devices/interfaces 1410, which are provided to allow a user to provide input to (such as user strokes), receive output from, and otherwise transfer data to and from the computing device 1400. These I/O devices/interfaces 1410 may include a mouse, keypad or a keyboard, a touch screen, camera, optical scanner, network interface, modem, other known I/O devices or a combination of such I/O devices/interfaces 1410. The touch screen may be activated with a stylus or a finger.

The I/O devices/interfaces 1410 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1410 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
projecting a boundary polygon associated with a first region of a three-dimensional (3D) object to a two-dimensional (2D) image plane, the boundary polygon comprising a plurality of contour vertices and edges connecting the plurality of contour vertices;
triangulating the first region in the 2D image plane to generate a 2D triangulation; and
generating a 3D mesh for the first region by mapping the 2D triangulation to the 3D object by connecting at least one pair of contour vertices with a path on a surface of the 3D object which corresponds to a straight line connection in the 2D image plane, and refining the 2D triangulation based on sample points collected along the path on the surface of the 3D object.

2. The computer-implemented method of claim 1, further comprising:
iteratively generating a 3D mesh for each remaining region of the 3D object by:
projecting a boundary polygon associated with that region to the 2D image plane;
triangulating that region in the 2D image plane to generate a 2D triangulation; and
mapping the 2D triangulation for that region to the 3D object.

3. The computer-implemented method of claim 2, further comprising:
generating an output mesh by combining each 3D mesh corresponding to each region.

4. The computer-implemented method of claim 3, further comprising:
providing the output mesh to a mesh contour detection and stylization system, wherein the mesh contour detection and stylization system generates a stylized line drawing based on the output mesh and a user-indicated style; and
causing the stylized line drawing to be returned to a user.

5. The computer-implemented method of claim 3, further comprising:
providing the output mesh to a mesh contour detection and stylization system, wherein the mesh contour detection and stylization system generates a vector graphics object corresponding to an occluding contour of the output mesh; and
causing the vector graphics object to be returned to a user.

6. The computer-implemented method of claim 1, wherein generating a 3D mesh for the first region by mapping the 2D triangulation to the 3D object, further comprises:
selecting a first contour vertex and a second contour vertex;
identifying the path connecting on the 3D object connecting the first contour vertex to the second contour vertex;
generating sample points along the path on the 3D object; and
generating a refined 2D triangulation using the contour vertices and the sample points.

7. The computer-implemented method of claim 6, wherein generating sample points along the path on the 3D object, further comprises:
adding the sample points that were generated on the path in a direction of travel from the first contour vertex to the second contour vertex; and
discarding the sample points that were generated on the path in a direction of travel from the second contour vertex to the first contour vertex.

8. The computer-implemented method of claim 1, wherein the 3D object is a self-overlapping object, a weakly self-overlapping object, or a weakly self-overlapping object with one or more holes.

9. The computer-implemented method of claim 1, further comprising:
receiving a request to generate occluding contours for the 3D object, the request including the 3D object and a viewpoint;
inserting contour vertices into an initial mesh of the 3D object, the contour vertices corresponding to at least one occluding contour on the 3D object; and
partitioning the 3D object into a plurality of regions based at least on the contour vertices.

10. A non-transitory computer-readable storage medium including instructions stored thereon which, when executed by at least one processor, cause the at least one processor to:
project a boundary polygon associated with a first region of a three-dimensional (3D) object to a two-dimensional (2D) image plane, the boundary polygon comprising a plurality of contour vertices and edges connecting the plurality of contour vertices;
triangulate the first region in the 2D image plane to generate a 2D triangulation; and
generate a 3D mesh for the first region by mapping the 2D triangulation to the 3D object by connecting at least one pair of contour vertices with a path on a surface of the 3D object which corresponds to a straight line connection in the 2D image plane, and refining the 2D triangulation based on sample points collected along the path on the surface of the 3D object.

11. The non-transitory computer-readable storage medium of claim 10, wherein the instructions, when executed, further cause the at least one processor to:
iteratively generate a 3D mesh for each remaining region of the 3D object by:
projecting a boundary polygon associated with that region to the 2D image plane;
triangulating that region in the 2D image plane to generate a 2D triangulation; and mapping the 2D triangulation for that region to the 3D object.

12. The non-transitory computer-readable storage medium of claim 11, wherein the instructions, when executed, further cause the at least one processor to:
generate an output mesh by combining each 3D mesh corresponding to each region.

13. The non-transitory computer-readable storage medium of claim 12, wherein the instructions, when executed, further cause the at least one processor to:
provide the output mesh to a mesh contour detection and stylization system, wherein the mesh contour detection and stylization system generates a stylized line drawing based on the output mesh and a user-indicated style; and
cause the stylized line drawing to be returned to a user.

14. The non-transitory computer-readable storage medium of claim 12, wherein the instructions, when executed, further cause the at least one processor to:
provide the output mesh to a mesh contour detection and stylization system, wherein the mesh contour detection and stylization system generates a vector graphics object corresponding to an occluding contour of the output mesh; and
cause the vector graphics object.

15. The non-transitory computer-readable storage medium of claim 10, wherein to generate a 3D mesh for the first region by mapping the 2D triangulation to the 3D object, the instructions, when executed, further cause the at least one processor to:
select a first contour vertex and a second contour vertex;
identify a path connecting on the 3D object connecting the first contour vertex to the second contour vertex;
generate sample points along the path on the 3D object; and
generate a refined 2D triangulation using the contour vertices and the sample points.

16. The non-transitory computer-readable storage medium of claim 15, wherein to generate sample points along the path on the 3D object, the instructions, when executed, further cause the at least one processor to:
add the sample points that were generated on the path in a direction of travel from the first contour vertex to the second contour vertex; and
discard the sample points that were generated on the path in a direction of travel from the second contour vertex to the first contour vertex.

17. The non-transitory computer-readable storage medium of claim 10, wherein the 3D object is a self-overlapping object, a weakly self-overlapping object, or a weakly self-overlapping object with one or more holes.

18. The non-transitory computer-readable storage medium of claim 10, wherein the instructions, when executed, further cause the at least one processor to:
receive a request to generate occluding contours for the 3D object, the request including the 3D object and a viewpoint;
insert contour vertices into an initial mesh of the 3D object, the contour vertices corresponding to at least one occluding contour on the 3D object; and
partition the 3D object into a plurality of regions based at least on the contour vertices.

19. A system comprising:
at least one computing device implementing an occluding contours generation system, the at least one computing device including a processor and a memory including instructions stored thereon which, when executed by the processor, cause the occluding contours generation system to:
project a boundary polygon associated with a first region of a three-dimensional (3D) object to a two-dimensional (2D) image plane, the boundary polygon comprising a plurality of contour vertices and edges connecting the plurality of contour vertices;
triangulate the first region in the 2D image plane to generate a 2D triangulation; and
generate a 3D mesh for the first region by mapping the 2D triangulation to the 3D object by connecting at least one pair of contour vertices with a path on a surface of the 3D object which corresponds to a straight line connection in the 2D image plane, and refining the 2D triangulation based on sample points collected along the path on the surface of the 3D object.

20. The system of claim 19, wherein the instructions, when executed, further cause the occluding contours generation system to:
iteratively generate a 3D mesh for each remaining region of the 3D object by:
projecting a boundary polygon associated with that region to the 2D image plane;
triangulating that region in the 2D image plane to generate a 2D triangulation; and
mapping the 2D triangulation for that region to the 3D object.

* * * * *